Feb. 18, 1958 T. J. HEDBÄCK ET AL 2,823,650

METHOD AND MEANS FOR HEAT EXCHANGE BETWEEN FLOWING MEDIA, PREFERABLY FOR REMOTE HEATING SYSTEMS

Filed Feb. 4, 1952 9 Sheets-Sheet 1

INVENTORS
T. J. HEDBACK
G. G. LUNDMAN
BY Ira Milton Jones
ATTORNEY

Feb. 18, 1958 T. J. HEDBÄCK ET AL 2,823,650
METHOD AND MEANS FOR HEAT EXCHANGE BETWEEN FLOWING
MEDIA, PREFERABLY FOR REMOTE HEATING SYSTEMS
Filed Feb. 4, 1952 9 Sheets-Sheet 2

INVENTORS
T. J. HEDBACK
G. G. LUNDMAN
BY Ira Milton Jones
ATTORNEY

INVENTORS
T. J. HEDBACK
G. G. LUNDMAN

BY [signature]
ATTORNEY

INVENTORS
T. J. HEDBACK
G. G. LUNDMAN
BY Ira Milton Jones
ATTORNEY

INVENTORS
T. J. HEDBACK
G. G. LUNDMAN
BY Ira Milton Jones
ATTORNEY

INVENTORS
T. J. HEDBACK
G. G. LUNDMAN
BY Ira Milton Jones
ATTORNEY

INVENTORS
T. J. HEDBACK
G. G. LUNDMAN

BY Ira Milton Jones
ATTORNEY

Feb. 18, 1958 T. J. HEDBÄCK ET AL 2,823,650

METHOD AND MEANS FOR HEAT EXCHANGE BETWEEN FLOWING MEDIA, PREFERABLY FOR REMOTE HEATING SYSTEMS

Filed Feb. 4, 1952 9 Sheets-Sheet 8

INVENTORS
T. J. HEDBACK
G. G. LUNDMAN
BY [signature]
ATTORNEY

Feb. 18, 1958 T. J. HEDBÄCK ET AL 2,823,650

METHOD AND MEANS FOR HEAT EXCHANGE BETWEEN FLOWING MEDIA, PREFERABLY FOR REMOTE HEATING SYSTEMS

Filed Feb. 4, 1952 9 Sheets-Sheet 9

INVENTORS
T. J. HEDBACK
G. G. LUNDMAN
BY [signature]
ATTORNEY

United States Patent Office 2,823,650

Patented Feb. 18, 1958

2,823,650

METHOD AND MEANS FOR HEAT EXCHANGE BETWEEN FLOWING MEDIA, PREFERABLY FOR REMOTE HEATING SYSTEMS

Tore J. Hedbäck and Gustaf G. Lundman, Sodertalje, Sweden, assignors to Aktiebolaget Svenska Maskinverken, Sodertalje, Sweden Application February 4, 1952, Serial No. 270,694

Claims priority, application Sweden February 6, 1951

5 Claims. (Cl. 122—32)

Figure 1:
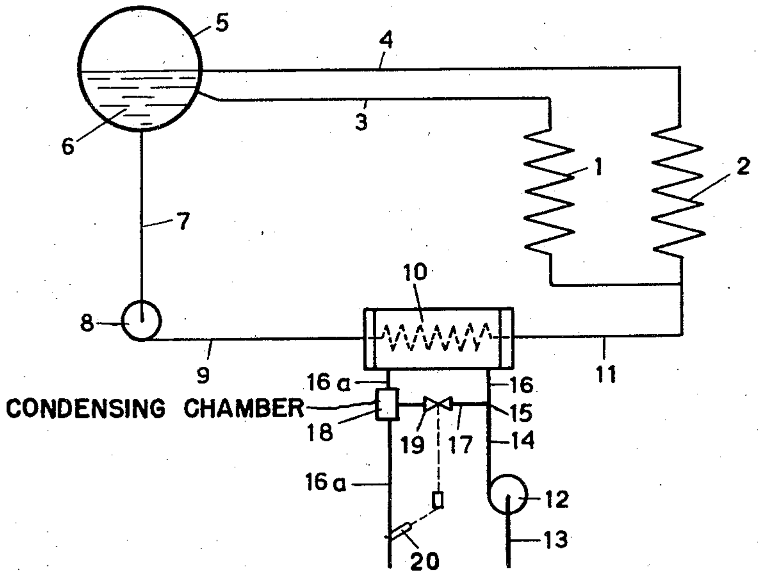

The present invention relates to remote heating systems and refers more particularly to a method and apparatus for heating a flowing medium circulating in a service or supply system.

A heating system usually comprises a circuit in which a heating medium is circulated. The heating medium emits heat through special elements located at required places, as for example radiators. The heat is supplied to the medium at one place in the circuit usually in such a manner and in such a quantity that the temperature of the medium is raised sufficiently to compensate for decrease in temperature due to the removal of heat at the elements to thus maintain the heat balance in the circuit.

As an example which will be familiar to those skilled in the art, the requirement for additional heat at the radiator of a steam or hot water system normally results in a demand for an increased rate of combustion at the furnace, the greater input of heat to the circulating fluid in the system as a result of such increased combustion rate being compensated by increased emission of heat at one or more of the radiators in the system to maintain a heat balance in the circulating medium.

The heat in systems of the type here under consideration is usually supplied by firing a hot water boiler or steam boiler adapted for this purpose. If the flue gases encounter heating surfaces in the boiler which have a temperature below their dew point they may condense, depositing corrosive substances on the heating surfaces and rapidly deteriorating them. For this reason it is necessary that the tempertaure of the heating surfaces be kept sufficiently high. If the medium flowing in the heating system enters the boiler directly it is difficult to avoid excessively low temperatures at the heat-exchange surfaces.

It is an object of the present invention to overcome this disadvantage by means of a method and apparatus whereby the fluid medium circulating in the heating system is heated indirectly so as to avoid the passage of excessively cool medium through the heat exchangers in the flue gas duct and the consequent danger of cooling the flue gases below their dew point. This objective is accomplished in the present invention by circulating the medium which flows in the heating system in indirect heat exchange relation with a heat transfer fluid flowing in a closed circulatory system including a heat exchanger in the flue gas pass, and which heat transfer fluid is at all times maintained at a temperature above the dew point of the flue gases.

The present invention also contemplates the provision of a method and apparatus whereby a highly versatile central heating plant may be provided for a community, which plant can be operated economically at all stages in the growth of the community. In a large community a central plant for supplying heat to all of the buildings is most economically operated as a combined generator of heat and electric power. Steam generated in the boiler of the plant is utilized to drive a turbine which in turn powers electrical generators, and the heating circuits are supplied from the condensers of the turbines. However, in the early stages of the development of the community it is extremely inefficient to operate in this manner since an excess of heat is developed which cannot be utilized at the limited number of outlets available. Even without the addition of turbines and the necessary auxiliary equipment for power generation, a plant intended for a community which is expected to grow substantially will have to operate at low steam loads at first, and this is inefficient because the efficiency of a steam boiler decreases rapidly with decreasing loads below that for which it is designed. Initially, therefore, it is desirable to operate such a plant as a hot water system, turbines and the necessary additional equipment for steam generation (such as feed water pump, feed water cleaners and the like) being added when the number of outlets justifies the conversion.

Heretofore, however, it has not been feasible to operate a boiler designed for steam generation in connection with a hot water system because the feedwater preheater in the flue gas passage of a hot water heater operates at substantially lower temperatures than the economizer of a steam boiler. Hence if a conventional steam boiler were employed for heating water to be used in a hot water system, rather than for steam generation, the temperature at the economizer (being utilized as a feed water preheater) would in all probability be below the dew point of the flue gases and would cause condensation of corrosive substances upon the exposed surfaces of the preheater. This is evident from the fact that only a relatively small amount of feed water is required in a steam generating plant and this water is converted into steam at a high temperature, whereas a hot water plant would require a relatively large volume of feedwater to achieve the same heat energy output because of the much lower temperature to which each unit volume of water is raised.

Designers of heating centrals of the type here under consideration have therefore been confronted with this dilemma: either they were compelled to operate the plant as a steam unit with very poor efficiency during the early stages of its operation, when the load was low, or, if they chose to operate it initially as a hot water plant with reasonably good efficiency, they were compelled to do substantial and costly remodelling when the increased load demand made it economically desirable to convert the plant to steam generation.

It is therefore another object of the present invention to provide a method of efficiently operating as a hot water plant a boiler designed for relatively high output steam generation.

The boiler in the apparatus of this invention is constructed as an ordinary steam boiler but is operated with hot water circulation. When the number of outlets has become suffcently great for the enlargement of the system to accommodate power generation the boilers are then converted from hot water operation to steam generation.

In the above way the advantages of the plant are increased in that when there are few connections it is necessary only to procure boilers and heat exchangers and thus not immediately burden the economy with the costs of feed water plants and turbines. In addition the advantage has been gained that the efficiency at low load is higher than if the boiler in question were operated as a steam boiler because the temperature of the heat absorbing heating surfaces where the coldest flue gases pass, namely the economizer surfaces in a steam boiler may be arbitrarily maintained at a suitable value immediately above the dew point even though the amount of water passing through said heating surfaces is larger than the amount which would be passed through the economiser of a corresponding steam boiler. This means that the average temperature difference across the economiser heating surfaces, viz. the difference in temperature between the water and the flue gases, will be greater due to the fact that the larger amount of water is not heated so rapidly as the assumed lesser feed water quantity in the steam boiler. The amount of water passing through the economiser unit in a plant operating according to the principles of this invention is independent of the load and due to this the absorption of heat from the flue gases will be greater than in usual steam boilers wherein the amount of feed water passing through the economiser is proportional to the load.

The invention will be more clearly explained hereinafter with reference to a number of embodiments diagrammatically shown in the accompanying drawings and in this connection further features of the invention will be set forth.

Figs. 1–12 diagrammatically show a number of embodiments of the invention.

Fig. 1 shows a steam boiler of a standard type utilized as a hot-water boiler which is provided with two or more heating surfaces 1 and 2 connected in parallel. Both heating surfaces are connected through conduits 3 and 4 respectively with a drum 5, from which water 6 is circulated to a heat exchanger 10 via a conduit 7 connected with the inlet of a pump 8 and a conduit 9 which connects the pump with the heat exchanger 10. Through a conduit 11 water from the heat exchanger is returned to both heating surfaces 1 and 2. The invention is also applicable to boilers of the natural circulation type, which means that the pump 8 may be dispensed with. All the elements mentioned above form together a closed circuit wherein the water heated in the heating surfaces 1 and 2 continuously flows to the drum 5, where separation of steam may occur and thence through the heat exchanger 10 for the purpose of emitting certain quantities of heat from the said water before the same is again introduced into both heating surfaces.

The heat exchanger 10, which may be of any suitable kind, also forms a path of flow for a service liquid, preferably water, flowing in a secondary system. In the secondary system, as shown in heavy lines, is a pump 12 having an inlet duct 13 and an outlet duct 14. The outlet duct is branched off at a point 15 on one hand into a conduit 16 leading into the heat exchanger 10 and on the other hand into a conduit 17. The conduit 17 is connected with a conduit 16a, leaving the heat exchanger, at a container 18, which is adapted to serve as a condensing chamber for any steam which may be formed in the secondary system inside the heat exchanger 10. The conduit 16a continues outwardly past the chamber 18 and may be connected with the conduit 13 via heat exchangers or heat emitting apparatus so as to form a more or less closed circulation system or the arrangement may be such that an open flow system is formed, e. g. for service water.

The above secondary system may be used for many purposes in the heat technics but is particularly preferred in so-called remote heating systems wherein the secondary system forms a closed circuit from which heat is removed by heat exchange at one or more points or from which medium is drained.

As mentioned above, the invention permits the utilization of a steam boiler of standard type as a hot water boiler and avoids at the same time expensive feed water plants due to the fact that essentially one and the same quantity of medium is continuously passed through the closed primary circuit except for small quantities of water lost by leakage and possibly by small escapes of steam or the like. This eliminates, on one hand, consumption of the energy required for the continuous boiling of raw water, as well as for feeding the same into the boiler and, on the other hand, avoids sediment deposits upon the internal walls of the heating surfaces, which heretofore has involved a great risk. As will be appreciated from studying Fig. 1, a throttling valve 19 in the conduit 17 is automatically controlled by a thermostat 20 located in the conduit 16a which forms the exit conduit of the secondary system. It is thus possible to satisfy the heat requirements of the secondary system by by-passing varying quantities of the service liquid in this system around and past the heat exchanger 10 through the by-pass conduit 17. The valve 19 in the by-pass conduit 17 is so positioned by the thermostat 20 that an adequate quantity of service liquid is at all times caused to pass through the heat exchanger 10. The service liquid which has been circulated through said exchanger is intermingled with that flowing therearound through the conduit 17, in the container 18, so as to maintain a uniform exit temperature, corresponding to the load upon the secondary system.

Thus the valve 19 may move between a pair of extreme positions viz. a fully closed position, in which the total quantity of service liquid in the secondary system flows through the heat exchanger 10 and on the other hand a fully open position in which substantially all of the service liquid is by-passed around the heat exchanger through the conduit 17. In this lastmentioned case a certain formation of steam may possibly be obtained within the heat exchanger 10, which steam, however, is condensed in the vessel 18 which has been shaped in such a way as to avoid condensing noise due to the mixing with the comparatively cold service liquid, entering through the conduit 17. The closed primary circuit thus operates essentially with one and the same quantity of heat transfer medium and at the same time gives off to the secondary system a quantity of heat which is made to vary with the load on the secondary system by reason of the fact that the heat transfer fluid circulating in the primary system is caused to exchange heat with varying quantities of the service liquid flowing through the secondary system.

Figure 2:
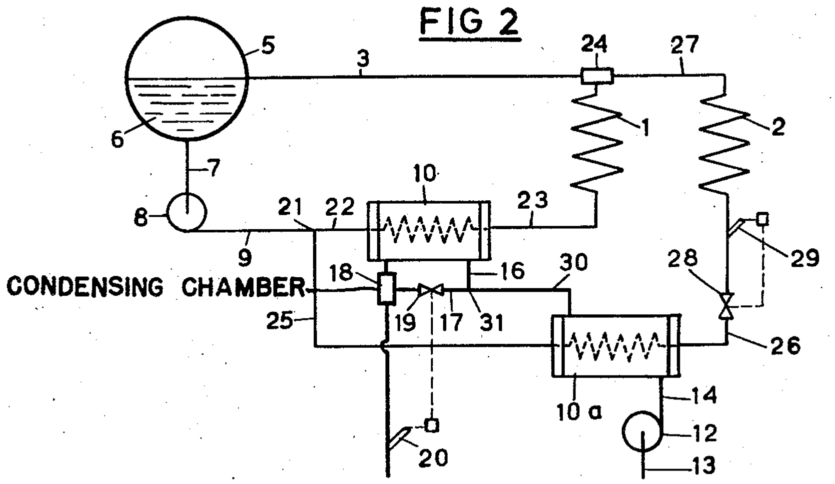

A further development of the hot water boiler according to Fig. 1 is illustrated in Fig. 2. There are a pair of heat exchangers 10 and 10a in the primary system, one in series with each of the heating surfaces 1 and 2, respectively, the two heat exchangers 10 and 10a, however, being connected in parallel with one another. Thus the heat transfer fluid drawn from the drum 5 through a conduit 7 by the pump 8 and pumped into the conduit 9 is divided at a point 21 into two branch streams. The heat transfer fluid flowing along one of these branch streams via a conduit 22 passes through the heat exchanger 10 and leaves the same through a conduit 23 on its way to the heating surface 1, which may have a relatively high temperature. From the heating surface 1 this stream is returned via a mixing vessel 24 through the conduit 3 or possibly through a separate conduit to the drum 5. The other branch stream diverted at the point 21, however, passes through a conduit 25, the heat exchanger 10a and a conduit 26 to the heating surface 2, which in this example is assumed to have a relatively low temperature (being for instance a convection surface in a flue gas duct) and via a conduit 27, a mixing vessel 24 and the conduit 3 back to the drum 5. In the conduit 26 is a valve 28, which is automatically positioned in accordance with the entrance temperature at the heat exchange surface 2 by means of a thermostat device 29. As to the secondary circuit, a flowing service liquid introduced through the conduit 13 is pumped by pump 12 into the heat exchanger 10a through the conduit 14. In this case the whole quantity of medium is assumed to continuously pass through the heat exchanger 10a but alternatively a shunt may be used. After leaving the heat exchanger 10a the service liquid flows through a conduit 30 to a branch-off point 31, where a conduit 16 is led into the heat exchanger 10. The by-pass conduit 17 with its valve 19 and the thermostat 20 are arranged the same as in the embodiment shown in Fig. 1.

The embodiment shown in Fig. 2 may be altered in such a way that the point 21 is located after the heat exchanger 10 in the path of heat transfer fluid circulation, in the conduit 23, and due to the fact that the temperature of the medium in this place would be lower than when the inlet 25 of the heat exchanger 10*a* is located at point 21 a larger amount of heat transfer liquid will be required in order to obtain cooling-down in the heat exchanger 10*a* to the same temperature. This involves the advantage that the average difference in temperature between flue gases and the heat transfer fluid in question will be greater than if the coupling had been made in accordance with Fig. 2. The system hereinafter described is based upon the principal diagram according to Fig. 2. It is assumed, however, that each diagram also should be developed on the basis of the modification of Fig. 2 as mentioned above.

In order to obtain the highest efficiency in boilers and the like, it is desirable to deprive the flue gases of most of their heat contents, but heretofore this has involved great difficulties which, however, are eliminated in an advantageous manner by the invention. In order to absorb heat from the relatively strongly cooled-down flue gases it is a requirement that the heating surfaces in question, in this case the heating surface 2, be kept at as low a temperature as possible so that the difference in temperature between the heating surface and the flue gases, both at the entrance and the exit end of the heating surfaces, will be sufficiently great for obtaining an advantageous recovery of heat.

To this end the heat exchanger 10*a* should be so resigned that the quantity of water flowing therethrough and the rate at which heat exchange occurs therein are such as to provide the optimum heat transfer conditions just described. The heating surface 2 is of such size that only little or no formation of steam takes place therein. The heating surface 1, however, is a steam generating surface. The heat exchange in exchangers 10 and 10*a* takes place in such proportions that the exchange of heat in 10*a* considered on a percentage basis increases with decreasing loads relative to the total exchange of heat. At low load practically all the exchange of heat is directed to the outer system 10*a*. Due to this an extraordinarily good overall efficiency is obtained for the boiler at low loads as well as at high loads in contradistinction to that of the arrangement according to Fig. 1 in which the amount of heat transfer fluid circulating in the inner circuit must be fairly constant. The lowest temperature of the heating surface 2, however, should at the same time be sufficiently high in order to avoid condensation of the flue gases, that is the temperature must be kept at a safe level above the dew point of the flue gases. This is obtained according to the invention by diverting a part of the heat transfer fluid at the point 21 to circulate it through the heat exchanger 10*a*, wherein great parts of its heat contents are transferred to the service liquid flowing in the secondary system so that this service liquid is preheated. The heat exchange surface of the heat exchanger 10*a* may be calculated with relatively great accuracy in such a way that the heat transfer fluid passing through the conduit 26 to the heating surface 2 will enter the latter at the most favourable temperature for heat absorption in the heating surface 2 and this result is further assured by the thermostatically actuated valve 28 in the conduit 26 which at all times provides a suitable throttling of the flow to the heating surface 2 in accordance with the entrance temperature of the heat transfer fluid in said surface.

Simultaneously the flow on the secondary side of the heat exchanger 10 is regulated by the thermostatically controlled valve 19 in the by-pass conduit 17 in such a way that the secondary medium leaving the same will have a temperature corresponding to the total load upon the secondary system. In this way varying proportions of the total secondary stream are caused to exchange heat with the total flow of heat transfer fluid in the closed circuit. It may be assumed that that part of the heat transfer fluid, which according to Fig. 2 flows through the heat exchanger 10*a*, will be considerably more cooled down on the outlet side of said heat exchanger than the quantity of heat transfer fluid which passes through the heat exchanger 10, and this is desirable in view of the fact that the heating surface 2, which is a convection surface, has a considerably lower temperature than the heating surface 1. Still greater cooling of the heat transfer fluid entering the heating surface would be effected if the inlet of the heat exchanger 10*a* were connected to branch off from the outlet of the heat exchanger 10. In certain cases, for instance at low load, nearly no flow takes place through the heat exchanger 10 on the secondary side whereas all heat transfer between the closed circuit and the secondary system is taken over by the heat exchanger 10*a*. The heat transfer to the secondary circuit in said heat exchanger 10*a* is thereby kept substantially constant and will suffice on one hand to satisfy the minimum load on the secondary system and on the other hand to cool down the heat transfer fluid flowing to the heating surface 2 in the closed circuit to a carefully balanced temperature in view of the recovery of heat. In this connection it may be mentioned that the exchange of heat in the exchanger 10 varies considerably as compared with the condition prevailing in the exchanger 10*a*. Both thermostatically controlled valves 19 and 28 thus mutually contribute to this advantageous control of the heat conditions in both circuits.

Figure 3:
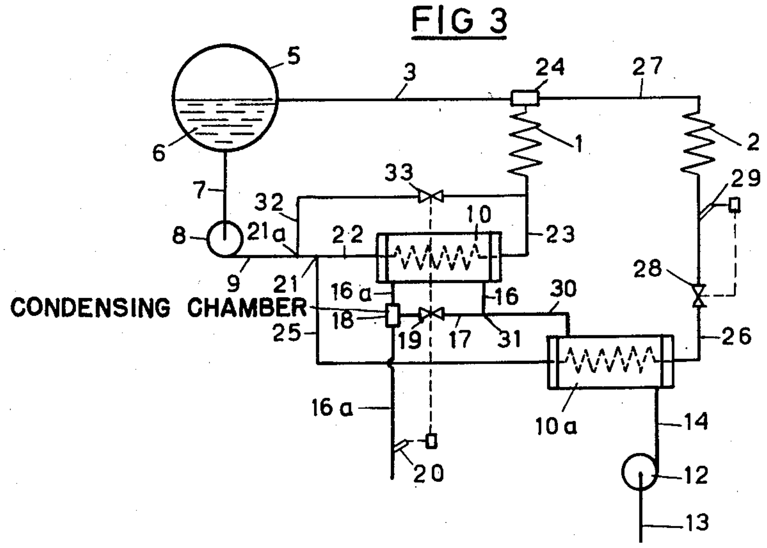

In order to avoid too great a formation of steam on the secondary side inside the heat exchanger 10 at times when valve 19 is fully open, and to prevent any risk of the heat exchanger 10 lowering the temperature of the heat transfer fluid supplied through the conduit 22 too much, so that excessively cool heat transfer fluid will flow through the conduit 23 to the heating surface 1, according to Fig. 3 a portion of the heat transfer fluid may be diverted in the closed circuit at the branch-off point 21*a* through a conduit 32 directly to the heating surface 1, whereby on one hand a suitable mixing temperature will be obtained for both streams in the conduits 23 and 32 before they pass in unison into the heating surface 1, and on the other hand a small exchange of heat will take place in the exchanger 10 so that formation of steam is avoided.

Further, in accordance with Fig. 3 a valve 33 may be inserted in the conduit 32, controlled by a thermostat 20, which valve is adapted to open before and to close after valve 19. At full load i. e. when the secondary system requires maximum supply of heat both valves 19 and 33 are closed. A reduced removal of heat in the secondary system causes the temperature of the returning service liquid in the conduit 13 to be increased and consequently the temperature in the conduti 16*a* tends to increase. The thermostat 20 then first actuates the valve 33 toward an open position and if the reduction of the heat exchange has not been sufficiently reduced when valve 33 is fully open, it then begins to open the valve 19. When the heating load increases the operation just described is reversed. Thereby unnecessary formation of steam in the heat exchanger 10 is avoided.

Figure 4:
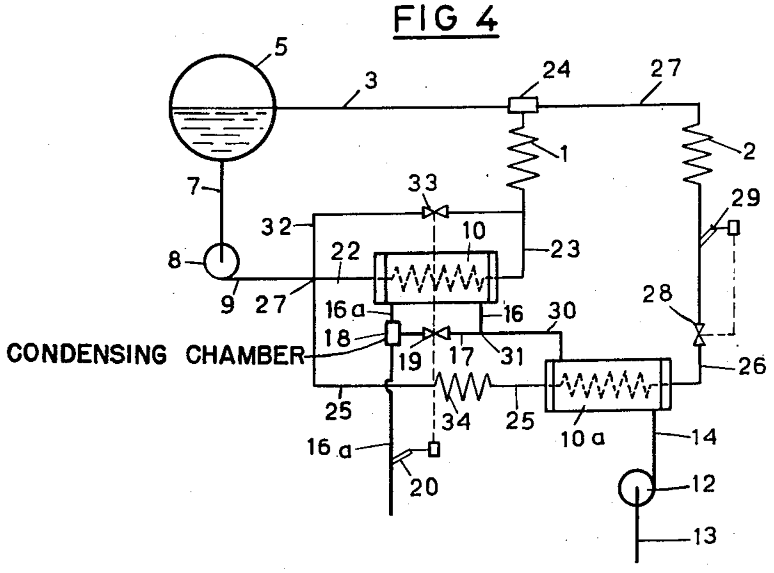
Figure 5:
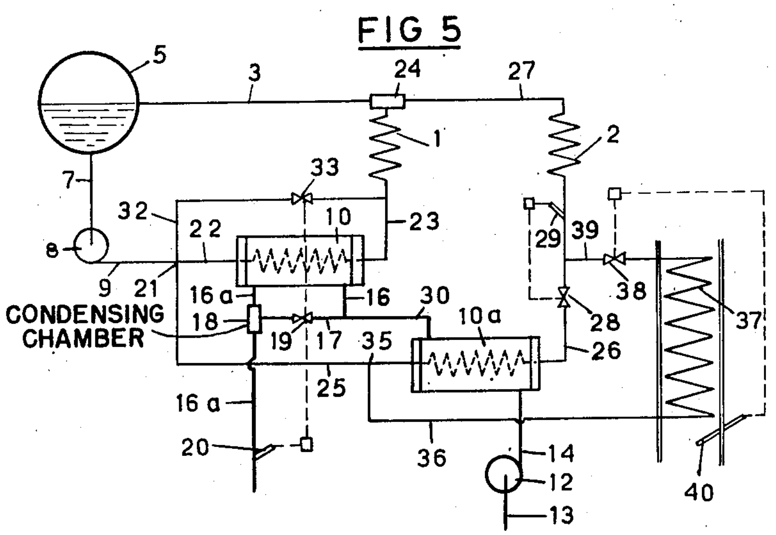

If, in the arrangement according to Fig. 3, one should desire to remove heat, possibly for preheating air, to the extent the conditions prevailing in the heat-exchanger 10*a* permit, it is possible to lower the temperature of the medium flowing to the heating surface 2 through the conduit 25 by means of the apparatus shown in Fig. 4, where an additional surface 34 is interposed in the conduit 25, which surface may be utilized for air preheating or possibly other preheating purposes. In this way the exchanged quantity of heat in this surface may be retained within the plant.

In Fig. 4 a heat-exchange surface 34 is shown as coupled in series with the conduit 25. Of course this heat-exchanger may be shunted across heat exchanger 10*a* in the closed circuit, e. g. as in Fig. 5, wherein at a branch-off point 35 part of the heat transfer fluid flowing in the conduit 25 is led off through a conduit 36 and passed through an air-preheater 37 before it is caused to discharge into the heating surface 2 via a conduit 39. The flow of heat transfer fluid through the air preheater 37 is regulated as to its quantity by means of a valve 38, which is inserted in return conduit 39. The valve 38 is automatically controlled by a thermostat 40 located in the flow of air on the exit side of the air preheater. It is also evident that the conduit 39 joins the conduit 26 ahead of the thermostat 29, so that the latter controls the valve 28 in accordance with the mixing temperature of the heat transfer fluid flowing through the conduits 26 and 39 to insure that the heating surface 2 will receive heat transfer fluid at the right temperature.

Figure 6:
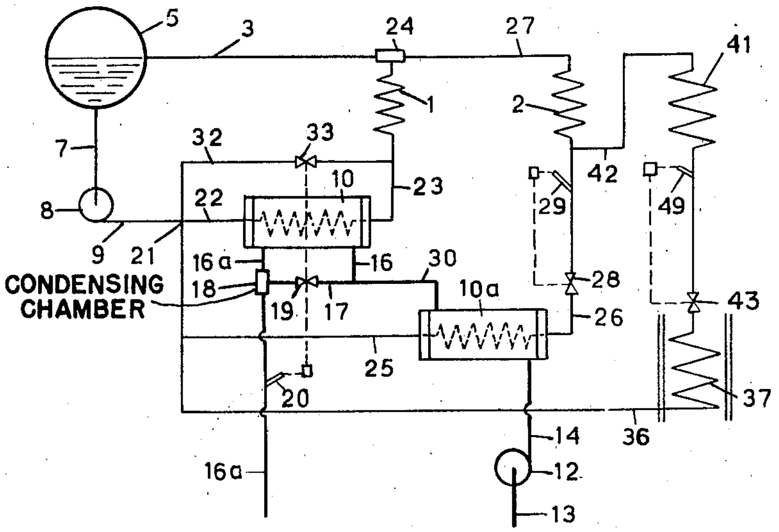

In cases where the dew point of the flue gases is relatively low, in accordance with Fig. 6, the heat transfer fluid in the air preheater 37 may be considerably cooled down and then heated again in a separate heating surface 41 before it is discharged into the heating surface 2 through a conduit 42. It is to be noted that the heating surface 41 should have a temperature slightly lower than the heating surface 2 in order that the temperature of the latter will not be unfavourably influenced. It may also be noted that the conduit 42, in contradistinction to the conduit 39, shown in Fig. 5, opens into the heating surface 2 downstream of the thermostat 29 and that a valve 43 is interposed between the air preheater 37 and the heating surface 41, said valve operating under the control of a thermostat 49 which responds to the entrance temperature in the heating surface 41.

Figure 7:
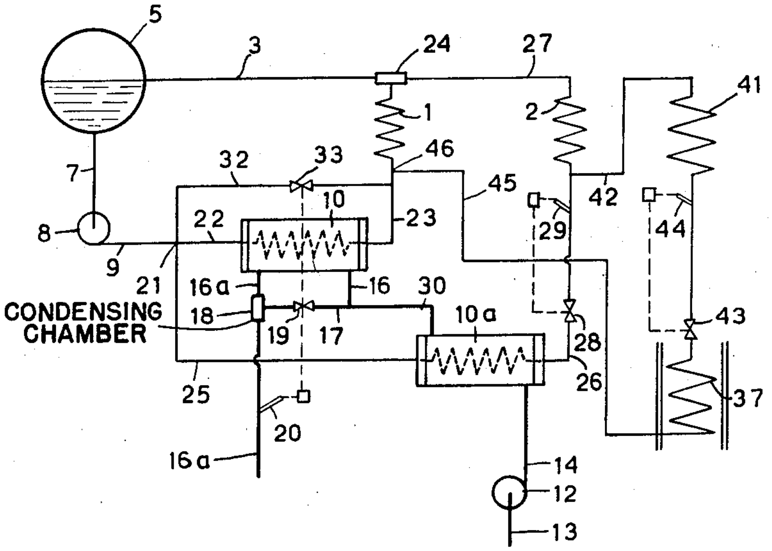
Figure 8:
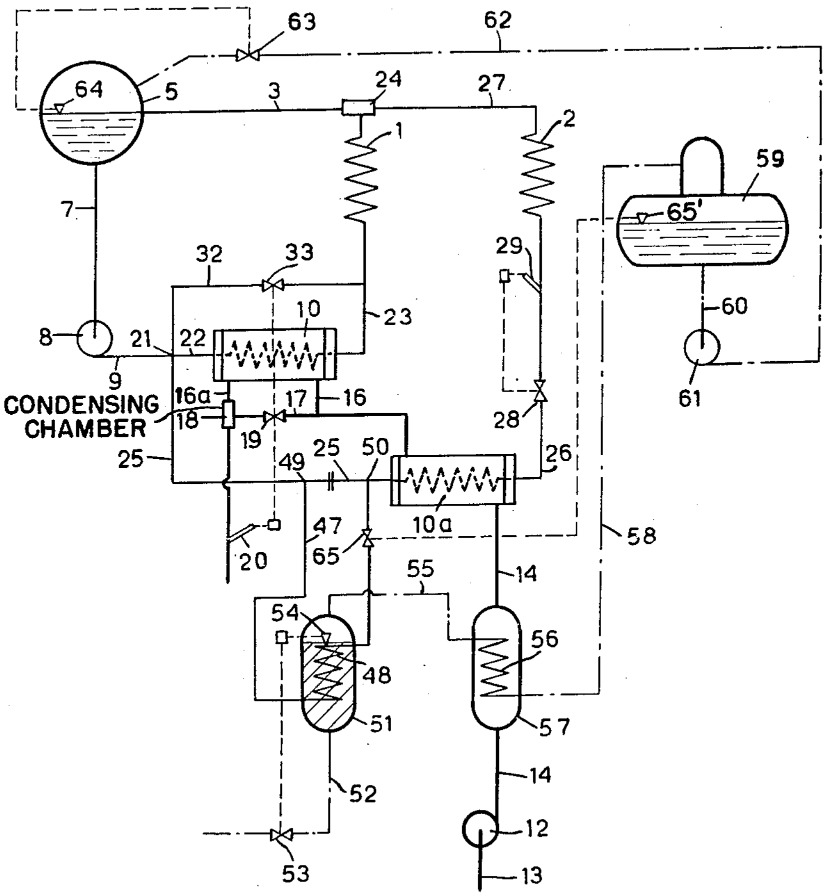
Figure 9:
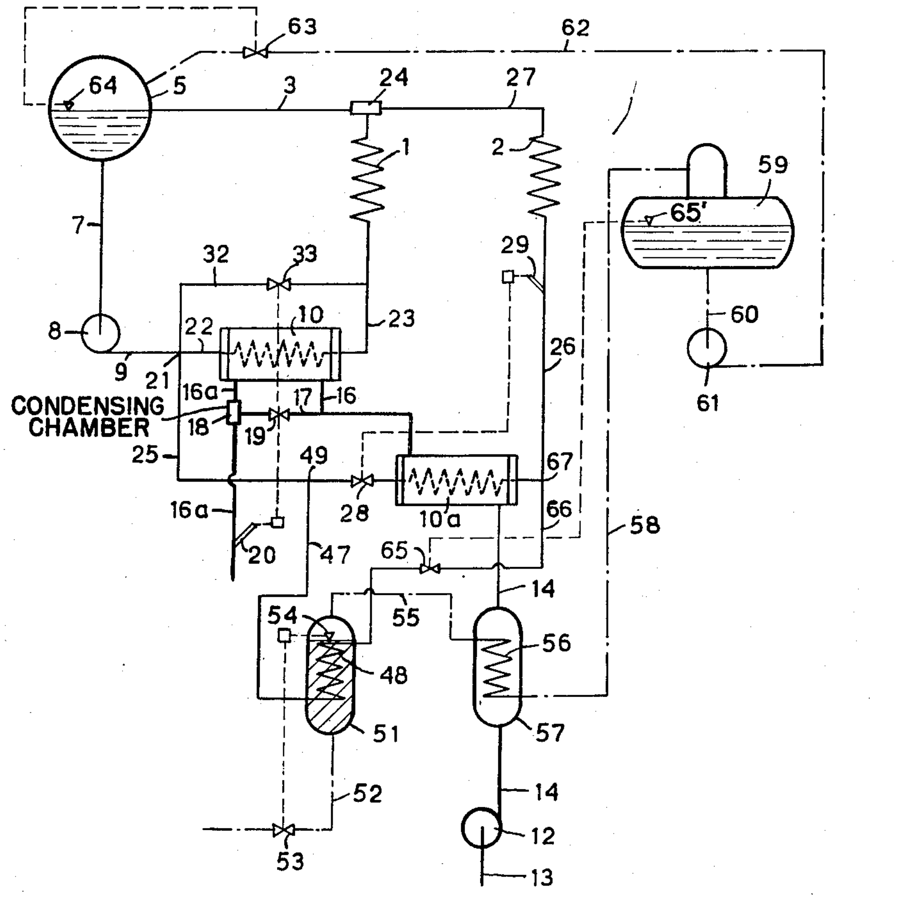

Another embodiment of the invention is shown in Fig. 7, which as compared with Fig. 6, differs therefrom in that the air preheater 37 is supplied with heat transfer fluid from the closed circuit through a conduit 45, which is connected upstream of the heating surface 1 at a point 46. For the rest the coupling diagram according to Fig. 7 corresponds to that of Fig. 6.

Also in a closed circuit it is necessary to take account of certain losses due to leakage of the working medium, which losses of a neccessity must be replaced from time to time. Instead of, or in conjunction with utilizing part of the heat contents of the closed circuit for air preheating this heat may be utilized for limited feed water preheating. In accordance with Fig. 8 one may thus draw off heat transfer fluid through a conduit 47 to a heat-exchange surface 48 and return the heat transfer fluid to the conduit 25 just upstream from the heat-exchanger 10*a*. In case of need one may arrange a throttling restrictor of any kind between the exit point 49 and the entrance point 50 so that the desired diversion through heat exchanger 48 will be effected at the point 49. The heat-exchange surface 48 is disposed in an evaporating vessel 51, to which raw-water is supplied through a conduit 52. In this conduit 52 is placed a valve 53, which is automatically controlled by a float 54 located in the vessel 51 so that the water in this vessel is always kept at a constant level. The vessel 51 is further communicated through a conduit 55 with a condenser 56, located in a vessel 57, interposed in the conduit 14 of the secondary circuit. From the condenser a conduit 58 in turn passes to a feed water tank 59 and thence water being treated in the feed water tank is drawn off through the conduit 60 to a pump 61, which through a conduit 62 pumps feed water into the drum 5. The feed is then automatically regulated by a valve 63 acting under the control of a float valve 64 located inside the drum. Returning to the supply conduit 52 for raw-water, the water flows into the vessel 51, where it is evaporated by the heat-exchange surface 48. In this connection it may be noted that the return flow of heat transfer fluid to the conduit 25 from the heat-exchanger surface 48 is automatically governed by means of a valve 65 controlled by a float valve 65' which is located in the feed water tank. The water evaporated in the vessel 51 flows through the conduit 55 into the heat-exchange surface 56, where it it condensed. The condensate in the heat-exchange surface 56 then passes through the conduit 58 to the feed-water tank 59, where it may be treated in an ordinary manner before it is finally pumped into the drum 5 through the conduit 60, pump 61, conduit 62 and valve 63. Alternatively the cooled-down water from the heat-exchange surface 48 may be returned to the conduit 25 as in Fig. 9, wherein a return conduit 6 rejoins the closed system at a point 67 located downstream from the exchanger 10*a*. In this way the drop in pressure in the heat-exchanger 10*a* is utilized and an additional throttling disc or the like is avoided. The valve 28 may in this case be placed upstream from the heat-exchanger 10*a* in order to obtain a suitable mixing temperature downstream from the point 67 of the heat transfer fluid passing through the heating surface 2.

Figure 10:
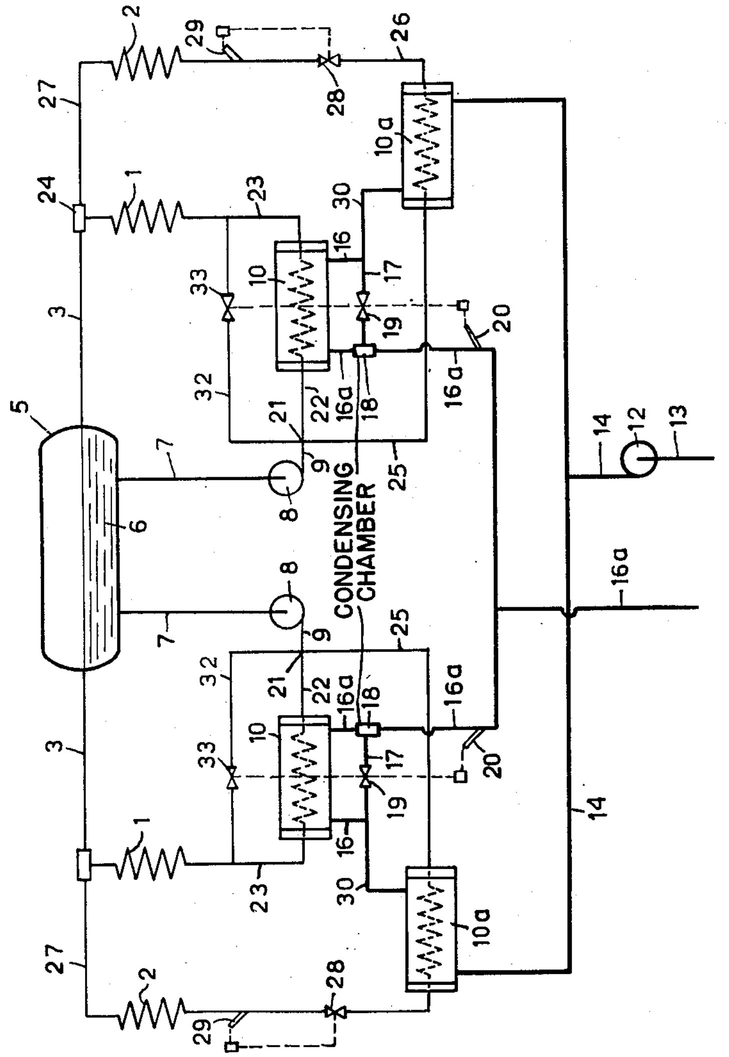

The arrangement according to Fig. 3 may be utilized in a combination of two separate boilers, which, as shown in Fig. 10, are connected with a common drum and communicate with a common secondary system. The reference numerals in Fig. 10 completely correspond to those of Fig. 3.

Figure 11:
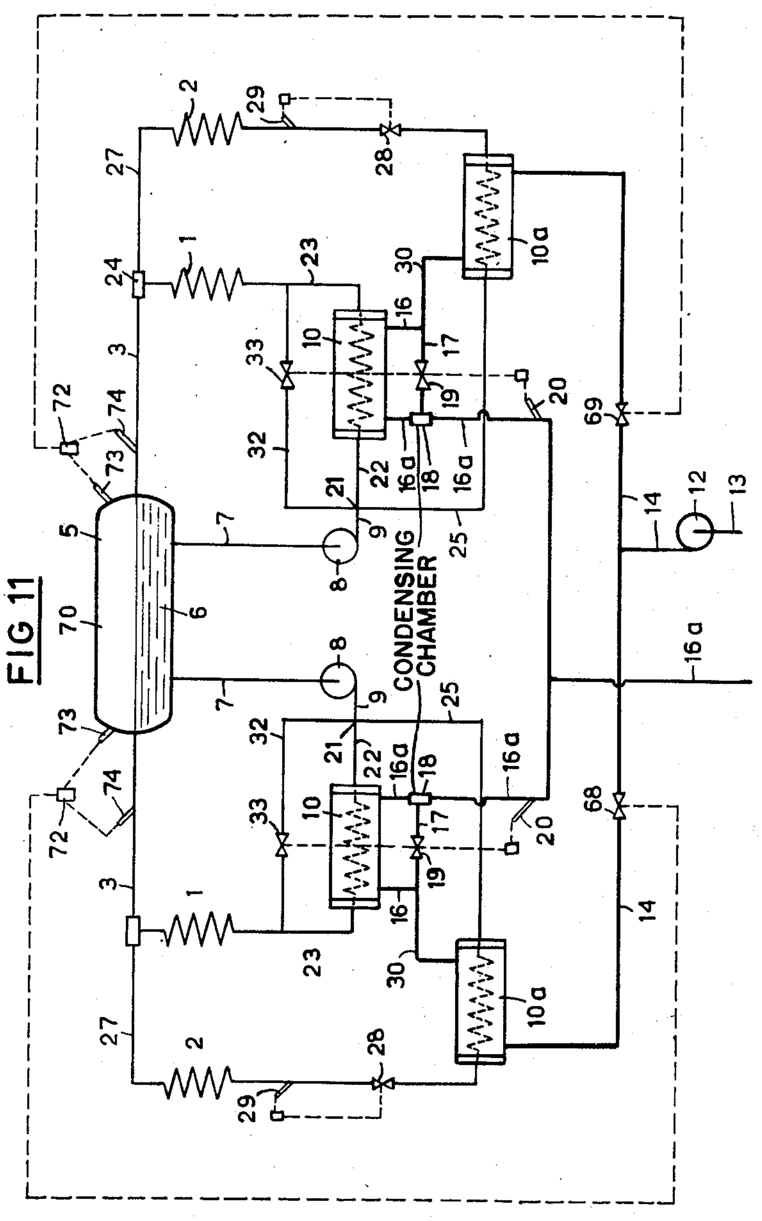

In the embodiment shown in Fig. 11 which for the most part coincides with Fig. 10, there are interposed in the secondary circuit ahead of the heat exchangers in the respective boilers, valves 68 and 69 respectively, which control the supply of service liquid to the heat-exchangers 10 and 10*a* in both boilers in dependence on one hand upon the temperature prevailing in a drum 70 common to the two boilers, and on the other hand upon the temperature in the conduit 3 passing to the drum, by means of the differential thermostat 72, which by means of sensitive bulbs 73 and 74 is connected with the drum 70 and the conduit 3 respectively.

Thus, if it should occur that the heating load on either boiler is lowered excessively e. g. in so-called dust burning furnaces being temporarily fired, the valve 69 or 68, as soon as the temperature in the conduit 3 is lowered, will more or less restrict the supply of heat transfer fluid to the boilers so that the latter will not deprive the secondary system of its heat. This arrangement is particularly of importance in cases where the boiler units are located at a great distance apart, and must be controlled from only one central as is intended in the arrangement shown.

Figure 12:
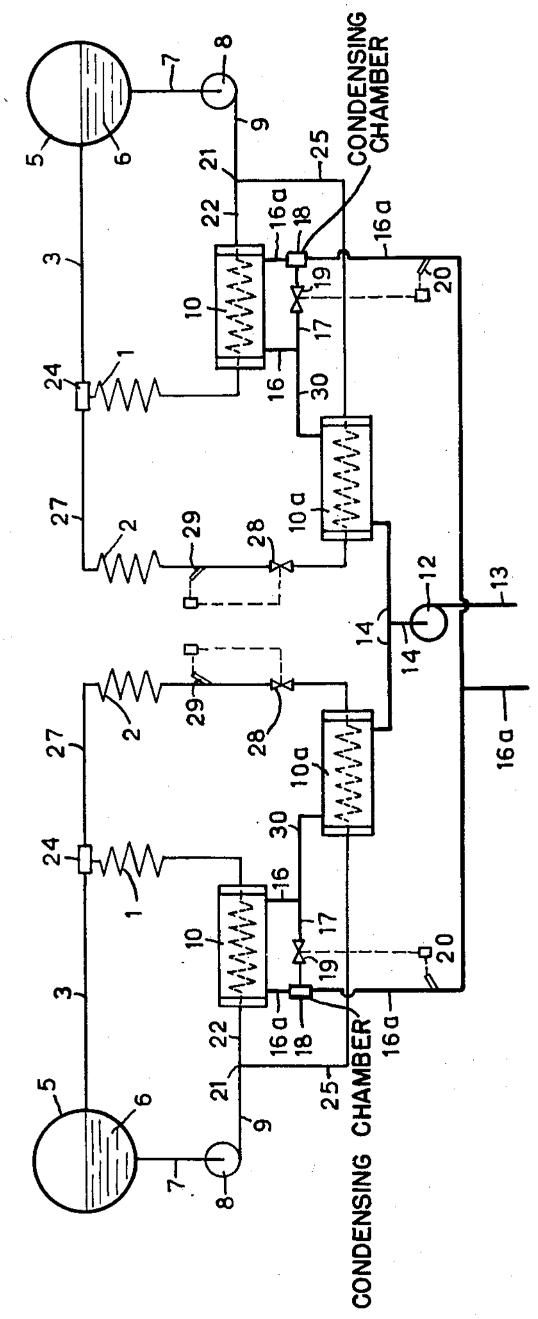

Figure 12 shows an additional combination according to the invention built up essentially as a double arrangement according to Figure 2, each boiler having a drum 5 of its own. However, the boilers are provided with a common secondary system wherein the pump 12 supplies the heat-exchangers with the secondary medium. The supply conduit of the secondary system is designated by 13, its discharge conduit by 16*a*.

The invention is not limited to the embodiments shown and described but may be varied in several aspects within the scope of the basic inventive idea.

From the foregoing description taken together with the accompanying drawings it will be apparent that this invention provides a highly efficient method and means for heating a service liquid for circulation in a service system having a relatively low heat output, by means of apparatus which is readily adaptable to high heat output steam generation, without the need for expensive remodeling of such apparatus, provision being made for accommodating rapid increases and decreases in heat load demand and for efficiently utilizing the available heat in the flue gases in the boiler without incurring danger of condensation on the heat transfer surfaces exposed in the flue gas passage.

Having now described our invention, what we claim as new and desire to secure by Letters Patent is:

1. The method of utilizing a steam boiler to heat liquid for a service system to accommodate low heat output requirements without necessitating remodeling of the boiler which method comprises: circulating heat transfer fluid at a constant rate in a closed system including said boiler and a secondary heat exchanger; circulating service liquid from a source thereof through said secondary heat exchanger, to be heated therein by indirect heat exchange with said heat transfer fluid, and thence to the service system; circulating other service liquid from said source thereof directly to the service system without circulating it through said secondary heat exchanger; and regulating the ratio of said service liquid circulated through the secondary heat exchanger to said other service liquid bypassed around said secondary heat exchanger, in such proportions that the portion of service liquid which is circulated through said secondary heat exchanger is maintained substantially in direct relation to the heat demands of the service system.

2. The method of claim 1 further characterized by the steps of: bypassing a portion of the heat transfer fluid circulating in the closed system around said secondary heat exchanger to avoid the same; and, at times when a major portion of service liquid is being circulated through said secondary heat exchanger, regulating the proportion of heat transfer fluid thus bypassed around said secondary heat exchanger substantially in inverse relation to heat demands of the service system over and above those satisfied by said regulating of circulation of service liquid.

3. The method of claim 2 further characterized by the steps of: circulating heat transfer fluid serially through a second secondary heat exchanger and through heat transfer surfaces in a relatively cool zone of the boiler; and, prior to circulating service liquid from said source thereof through said first designated secondary heat exchanger or to the service system, circulating the same through said second secondary heat exchanger to be heated therein by indirect heat exchange with heat transfer fluid.

4. Apparatus for utilizing a steam boiler to heat water for utilization in a service system to efficiently accommodate low heat output requirements without necessitating remodeling of the boiler, comprising: a secondary heat exchanger located outside the boiler; means defining a closed system including the boiler and said secondary heat exchanger and in which heat transfer fluid may circulate at a constant rate; means for circulating water from a source thereof through said secondary heat exchanger, to be heated therein by indirect heat exchange with heat transfer fluid, and thence to the service system; means for circulating other water from said source thereof directly to the service system, thus bypassing said secondary heat exchanger; and means for regulating the relative amount of water circulated through said secondary heat exchanger in substantially direct proportion to heat demand of the service system.

5. The apparatus of claim 4 further characterized by: means for bypassing heat transfer fluid circulating in said closed system around said secondary heat exchanger to avoid the same; and means operative at times when the proportion of water circulated through said secondary heat exchanger substantially exceeds that bypassed therearound, for regulating the ratio of heat transfer fluid circulated through said secondary heat exchanger to that bypassed therearound in substantially direct relation to further heat demands of the service system.

References Cited in the file of this patent

UNITED STATES PATENTS

| | | |
|---|---|---|
| 1,612,854 | Broido | Jan. 4, 1927 |
| 1,833,130 | Roe | Nov. 24, 1931 |
| 1,937,335 | Foley | Nov. 28, 1933 |
| 1,992,251 | Stewart | Feb. 26, 1935 |
| 2,026,341 | Brown | Dec. 31, 1935 |
| 2,320,911 | Cooper | June 1, 1943 |
| 2,586,998 | Schlenz | Feb. 26, 1952 |
| 2,623,506 | Dalin et al. | Dec. 30, 1952 |
| 2,635,587 | Dalin et al. | Apr. 21, 1953 |

FOREIGN PATENTS

| | | |
|---|---|---|
| 575,509 | Great Britain | Feb. 21, 1946 |
| 629,298 | Great Britain | Sept. 16, 1949 |
| 465,918 | Canada | June 20, 1950 |